(12) United States Patent
Ercan et al.

(10) Patent No.: US 6,240,217 B1
(45) Date of Patent: *May 29, 2001

(54) DIGITAL IMAGE PROCESSING (75) Inventors: Gurchan Ercan, Glenroy; Peter Whyte, South Melbourne, both of (AU)

(73) Assignee: Redflex Traffic Systems Pty LTD, Melbourne (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,360

(22) Filed: Feb. 24, 1998

(30) Foreign Application Priority Data

Feb. 24, 1997 (AU) .................................................. PO5258

(51) Int. Cl.$^7$ ............................. G06T 5/00; G06K 9/46; G06K 9/56
(52) U.S. Cl. ........................... 382/274; 382/105; 382/205
(58) Field of Search .................................. 382/167, 254, 382/300, 219, 252, 263, 267, 272, 274, 105, 205, 195, 206

(56) References Cited

U.S. PATENT DOCUMENTS

| 4,878,248 | * | 10/1989 | Shyu et al. | 282/105 |
| 5,651,075 | * | 7/1997 | Frazier et al. | 382/105 |
| 5,774,599 | * | 6/1998 | Muka et al. | 382/254 |
| 5,920,656 | * | 7/1999 | Gahang | 382/274 |

FOREIGN PATENT DOCUMENTS

P05258 * 2/1998 (AU) .

* cited by examiner

*Primary Examiner*—Scott Rogers
(74) *Attorney, Agent, or Firm*—Dergosits & Noah (57) ABSTRACT

A method of processing digital image information, including pixel intensity information, includes the steps of identifying a region of the image in which pixel intensities are similar to each other, but the median pixel intensity differs significantly from the median pixel intensity of other parts of the image; and modifying pixel intensities in the identified region so that the median for the region is closer to the median for the other parts of the image. A related method of processing digital image information involves modifying pixel intensities according to a non-linear algorithm, with the result that one or more regions of the image have their median pixel intensities adjusted to a level which is closer to the median pixel intensity for other parts of the image. A composite digital image can be formed by obtaining first and second digital images of the same scene but with different exposure or light reception conditions so that one of the digital images has higher pixel intensity values than the other; identifying one or more regions on the first image which are less clear than the corresponding regions on the second image; and replacing the identified regions of the first image with the corresponding regions of the second image.

8 Claims, 12 Drawing Sheets

FIG. 1

4-BIT GREY SCALE
(16 TONES-BLACK/WHITE)

8-BIT GREY SCALE
(256 TONES-BLACK/WHITE)

DIGITAL IMAGE PROCESSING

This application is related to applications filed at the same time by the same applicant entitled "Imaging Apparatus" (claiming priority from Australian Provisional Application PO5257 filed Feb. 24, 1997) and "Vehicle Imaging and Verification" (claiming priority from Australian Provisional Application PO5256 field Feb. 24, 1997). The contents of those applications are hereby incorporated herein by reference.

This invention relates to a method of processing digital image information. It relates particularly but not exclusively to a method of selectively modifying pixel intensity information in order to improve legibility or visibility of parts of a digital image.

Image contrast problems resulting in under-exposure and over-exposure of parts of an image are relatively common in photography. When an image of a person or object is taken facing into the sun, or with some other background which is bright compared to the person or object, the person's or object's features often are difficult to discern in the finished photographic image. Similarly, when part of the image is very bright compared to the rest of the image, the bright part is often over-exposed or "burnt out", so that its details are not discernible in the finished photographic image.

This problem is particularly noticeable in consumer video cameras which have automatic light contrast controls based on average light intensity for an image. In order for such video cameras to be able to capture images with a range of different intensities, they increase or decrease the brightness of each image captured, depending on the average brightness of all pixels in the image. When an image is being taken, for example, of a person in an unlit room against the background of a window, with bright sunshine outside, the person will often appear merely as a silhouette against the window, because the camera has compensated for the bright background by reducing the pixel image intensity. If the person moves against a wall in the same room, so that the window is no longer in the background, the average pixel intensity reduces, and the camera compensates by increasing pixel intensities, so that the person's features become visible.

In some video cameras, a manual image intensity override control is provided to allow an operator to compensate for this problem. The operator can move the control to ensure that the image pixel intensities remain bright even when the background is bright. This results in "image burn" (or over-exposure) for the background, but at least it ensures that the details of interest, such as the person's face, remain clearly visible. Alternatively, if the operator is taking images of, say, a fireworks display on a dark night, the camera will naturally tend to brighten the pixel intensities to compensate for the darkness of the average pixel intensity, with the result that the fireworks images are "burnt out". By using the manual exposure control, the operator can ensure that the pixel intensities remain dark and the fireworks remain visible.

In film-based photography, it is possible to compensate for a bright background or a dark background by varying the length of exposure during development of the film. However, if it is desired that very dark and very bright features both be visible in a photograph, it is often necessary to use two different exposures and create two separate images.

Figure 14A:
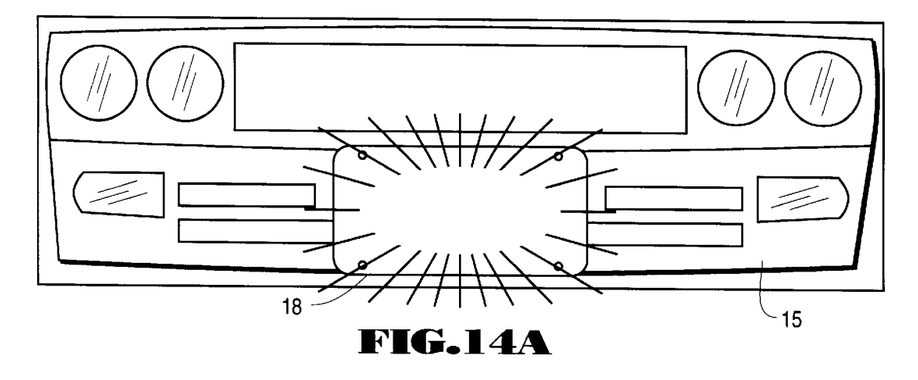
FIGS. 14a and 14b show an image of a vehicle with an over-exposed licence plate, a typical case of "optical burn".
Figure 14B:
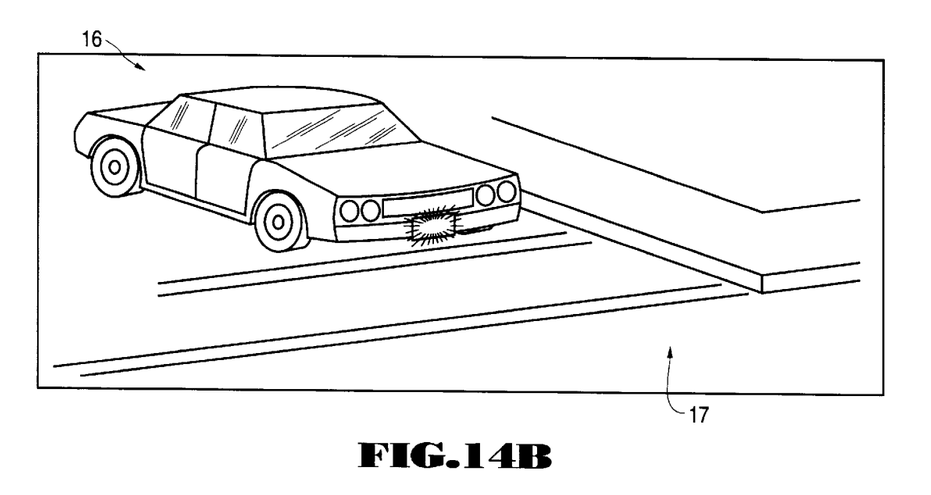

A particular application in which image contrast presents a problem is traffic cameras used in Law Enforcement Programs such as speed and red-light violation prosecution. Due to the retro-reflective nature of most licence plates, any light energy which is directed towards this area is reflected back at a level (result of a high reflection efficiency) which is higher then the average intensity entering the camera. Consequently an optical burn (ie over exposure) appears around the area of the licence plate. An example of this is shown in FIG. 14.

SUMMARY OF THE INVENTION

An object of the present invention is to provide a method of selectively varying the image intensity of part of an image.

According to a first aspect of the present invention there is provided a method of processing digital image information which includes pixel intensity information, including the steps of:

identifying a region of the image in which pixel intensities are similar to each other, but the median pixel intensity differs significantly from the median pixel intensity of other parts of the image; and modifying pixel intensities in the identified region so that the median for the region is closer to the median for the other parts of the image.

The identified region of the image may have a median pixel intensity below the median pixel intensity of the rest of the image, as in the previously described example of a person photographed in a dark room against the background of a bright window. The region may comprise the person's face, and the pixels in the region of the person's face may be modified by increasing their intensity values until their median intensity value approaches the median for the rest of the image. This results in an image which shows both the background and the person in good detail.

Alternatively, the identified region may have a median pixel intensity higher than the median for the rest of the image, as in the previously described example of the retro-reflective licence plate. In this case, the identified region is the licence plate, and the pixel intensities in that region are modified by reducing their intensity values until their median intensity value approaches the median for the rest of the image. Again, this results in an image which shows both the background and the licence plate in good detail.

The region may be identified in any suitable way. One way of identifying the region is for a person to examine the image and manually identify any region which needs pixel intensity correction. Another way is locate computationally any pixels which have an intensity greater than a particular high value or less than a particular low value and which have more than a predetermined number of other pixels meeting the same criteria within a predetermined distance. Another way arises when all images being processed have common features—in this case, a predefined region at the same place on each image can be used, if it is known in advance that the region contains pixels which require pixel intensity correction. Alternatively, if it is known that a similar-shaped region requiring pixel intensity correction will appear on all images, but not necessarily in the same place (as in the case of traffic images featuring retro-reflective licence plates), a shape recognition algorithm may be applied to the image to locate the region.

Any suitable pixel intensity modification algorithm may be applied to the identified region. One suitable modification algorithm involves adding a fixed intensity value to, or subtracting a fixed intensity value from, all pixel intensity values in the identified region. Another algorithm involves multiplying or dividing all pixel intensity values in the region by a fixed amount. It will be appreciated that many different algorithms using fixed or sliding scales may be used, depending upon the particular application.

According to a second aspect of the invention, there is provided a method of processing digital image information by modifying pixel intensities according to a non-linear algorithm, with the result that one or more regions of the image have their median pixel intensities adjusted to a level which is closer to the median pixel intensity for other parts of the image.

In this aspect of the invention, the pixel modification algorithm can be applied to the whole of the image, and not just to a particular identified region. For example, the algorithm may specify that all pixel intensity values over a particular threshold are to be reduced according to a particular scale, and all values under the threshold are to be kept constant, or increased or reduced according to another scale. In the case of the previously described example of a person photographed in a dark room against the background of a bright window, this type of algorithm may be successful in selectively increasing pixel intensities in the face region relative to pixel intensities elsewhere. On the other hand, the results may be less than desirable if other parts of the image which do not require intensification have pixel intensities similar to those of the face region.

When processing digital images according to the first and second aspects of the invention, the input device (such as a scanner or a digital camera) needs to have a sufficient "dynamic range" to resolve all the light intensities under consideration. The dynamic range of a CCD imaging system is the ratio of CCD saturation (full well charge) to the read noise. It is the ability to detect quantitatively very dim and very bright light information in a single pixel. For example, if a CCD has a typical full well of 45,000 electrons and 11 electrons read noise, then the dynamic range is 45,000/11= 4091 levels or 20 $\text{Log}_{10}(4091)=71$ dB.

With a dynamic range of 4091 levels an analog to digital converter (ADC) of 12 bits is needed to resolve the small voltage levels representing the small variants in light levels across the spectrum of information being captured by the CCD. However, this produces a large volume of data. A 12 bit ADC produces 4096 levels, which in the case of an RGB CCD translates to $4096 \times 4096 \times 4096 = 6.9 \times 10^{10}$ bits of RGB information which are beyond the resolving capabilities of the human eye. The average human eye can only resolve 64 or at most 128 grey levels or intensities.

Because of the human eye's limited ability to resolve large spectrums of intensities and colours, there is little value in storing the large amounts of information produced by a CCD with a broad dynamic range. The present invention is primarily directed towards selecting and presenting those parts of the pixel intensity range which provide the most useful information; however, a useful side effect is that this results in a very significant compression of the size of data which must be stored.

One suitable algorithm for achieving this is to allow a particular relatively broad band of intensity levels in the final compressed image to represent the narrow band of pixel intensity values which require clarification (eg, the licence plate "burnt out" pixel values, or the face "blacked out" values) and a comparatively narrow band of intensity levels in the final image to represent the rest of the image. In other words, the part of the image which requires clarification has its pixel intensity range expanded (or compressed by an amount significantly less than the compression of the rest of the image) and the rest of the image is compressed.

For example, an 8-bit intensity pixel provides 256 different possible intensity or grey-scale levels. It may be desirable to compress this into a 4-bit pixel (which has 16 different possible intensity levels). In the original image, the "burnt out" licence plate may have all pixel intensity values in the region above level 230. A suitable result in which the licence plate is legible might be achieved by mapping the first 230 levels in the original image to levels 1 to 10 in the compressed.

For example, an 8-bit intensity pixel provides 256 different possible intensity or grey-scale levels. It may be desirable to compress this into a 4-bit pixel (which has 16 different possible intensity levels). In the original image, the "burnt out" licence plate may have all pixel intensity values in the region above level 230. A suitable result in which the licence plate is legible might be achieved by mapping the first 230 levels in the original image to levels 1 to 10 in the compressed image, and mapping levels above 230 in the original image to levels 11 to 16 in the compressed image.

According to another aspect of the invention there is provided a method of forming a composite digital image including the steps of:

obtaining first and second digital images of the same scene but with different exposure or light reception conditions so that one of the digital images has higher pixel intensity values than the other;

identifying one or more regions on the first image which are less clear than the corresponding regions on the second image; and replacing the identified regions of the first image with the corresponding regions of the second image.

The regions identified as less clear than corresponding regions on the second image may be "burnt out" regions such as a retro reflective number plate or "blacked out" regions such as the details of a person's face in an otherwise bright image.

Prior to or as part of the step of replacing the identified regions of the first image with the corresponding regions of the second image, the intensities of the pixels in the first image and/or the second image may be manipulated. If, for example, the pixels in the first image have 64 different intensity levels, and in an "burnt out" region all pixels have intensity of 64, whereas in the second darker version the corresponding pixels of the "burnt out" region have intensity values of from 33 to 64, all pixels in the first image could be reassigned intensity values of between 1 and 48, with all intensity values between 33 and 64 in the second image being reassigned to values between 49 and 64, before the replacement operation, with the result that the portion of the first image identified as "burnt out" remains brighter than the rest of the image.

Although the method has been described with reference to combining two separate images, it will be appreciated that the technique is equally applicable to a combination of more than two images.

The first and second digital images may be obtained in any suitable manner. They may be obtained simultaneously or sequentially. It is preferred that a single optical plane or path be used to ensure pixel relativity in each image, so that pixels align correctly. One image may have a longer exposure time than the other. Additionally or alternatively, an optical filter may be applied to a digital camera in taking one of the images.

In one preferred arrangement, a single objective lens is used to provide a common optical path for two CCDs. The image is split using a 50% reflective mirror with 50% of the light going to a first CCD and 50% going to a second CCD. The ratio can be adjusted to suit the application. Most CCDs have built-in electronic shutters which can control the exposure time of the imaging area.

Configuring the first CCD to have a relatively slow shutter speed (say in the order of $1/250^{th}$ of a second) can provide sufficient image contrast for low and medium light levels (that is, energy levels normally expected back from the object of interest). The second CCD can be geared to record abnormally high light levels (resulting, for example, from in-line flash systems targetted directly at retro-reflective licence plates) with a shutter speed of around $1/1000^{th}$ of a second. Running the shutter at this speed also reduces the effects of velocity blur caused by an object moving whilst the camera shutter is open (thus increasing licence plate readability).

This configuration ensures that a sufficient dynamic range of data is available for the image combining/compression processes and ensures successful outcomes. It also allows for the use of cheaper lower dynamic range CCDs and associated electronics such as analog to digital converters.

An electronic feedback mechanism such as automatic gain controls (AGCs) can be used to automatically adjust shutter speeds or output amplification to ensure nominal system outputs.

According to a fourth aspect of the invention, there is provided a method of forming a composite digital image including the steps of:

obtaining first and second digital images of the same scene but with different exposure or light reception conditions so that the first digital image has higher pixel intensity values than the second;

identifying all pixels in the first image which have a pixel intensity greater than a predetermined value; and replacing the identified pixels in the first image with corresponding pixels from the second image.

This method may be varied by first identifying all pixels in the second image which have a pixel intensity lower than a predetermined value, and then replacing the identified pixels in the second image with corresponding pixels from the first image.

The intensity values of pixels in the first and/or second image may be manipulated before or during the replacing step. For example, if there are 64 different intensity levels in each image, and the predetermined value for the first image is 64, there may be a significant number of pixels in the first image with that value. The corresponding pixels in the second image may have intensity values ranging between 33 and 64. In order to ensure that the replaced pixels from the first image retain intensity values greater than the pixels which are not replaced, each of the pixel intensities in the first image could be multiplied by 0.75, giving a range of from 49 to 64. This would then ensure that the replaced pixels remained brighter than the non-replaced pixels.

It will be appreciated that the third and fourth aspects of the invention can operate effectively when the CCDs or other digital imaging devices have a relatively low dynamic range; that is, when the number of different intensity levels which can be detected is relatively low. An advantage of processing the digital information arises because a smaller amount of information is captured. However, the overall flexibility available to these methods of operation is lower than for the methods described in the first and second aspects of the invention.

It will be appreciated that all four aspects of the invention are applicable to image scanners, digital cameras and any other digital imaging apparatus.

This invention will hereinafter be described in greater detail by reference to the attached drawings which show example forms of the invention. It is to be understood that the particularity of those drawings does not supersede the generality of the preceding description of the invention.

DETAILED DESCRIPTION

Figure 1:
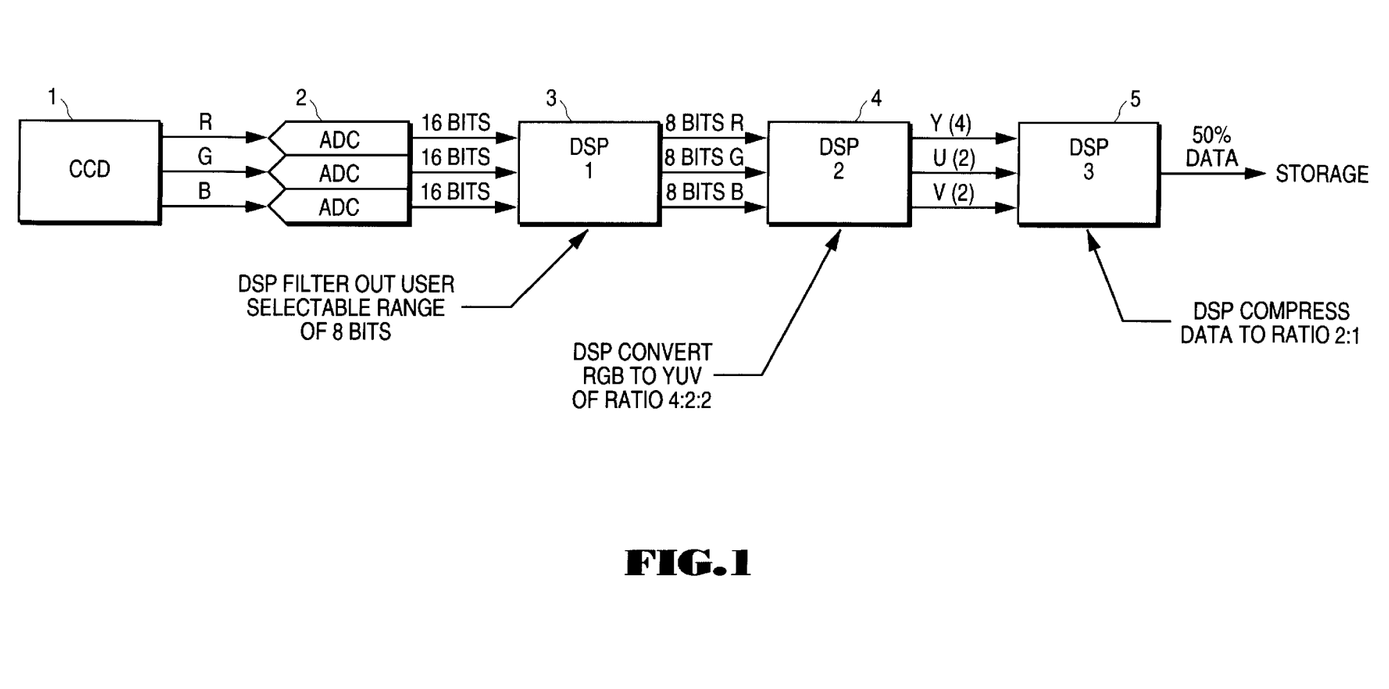
FIG. 1 is an illustration of a typical hardware layout according to an embodiment of the invention.

FIG. 1 shows a typical hardware layout for apparatus which uses the inventive method. A light image is detected by a charge coupled device (CCD) 1, which is an element of a type which is used in video cameras. The detected image is split into red, green and blue (RGB) analog streams, which are passed to analog to digital converters (A/D converters) 2. The digital signals so produced are passed to a first digital signal processor (DSP) stage 3, which in the example illustrated filters the 16-bit RGB digital signals into 8-bit RGB signals using user-selectable criteria. The signals are then passed to a second DSP stage 4, in which RGB signals are converted to a more compact YUV format. The YUV signals are then passed to a third DSP stage 5, in which a data compression algorithm is applied. It will be appreciated that this configuration is illustrative only, and many different configurations can be applied to achieve the objects of the invention.

A typical CCD has an image sensing area which is configured into horizontal lines, each containing numerous pixels. As light enters the silicon in the image sensing area, free electrons are generated and collected inside photosensitive potential wells. The quantity of the charge collected in each pixel is a linear function of the incident light and the exposure time. Thus a conversion between the light energy and electrical charge is obtained.

After exposure the charge packets are transferred from the image area to the serial register, typically at the rate of one line per clock pulse, although this depends on the particular CCD. Once an image line has been transferred into the serial register, the serial register gate can be clocked until all of the charge packets are moved out of the serial register through a buffer and amplification stage producing a signal of approximately 50 mV.

Colour sensing is achieved by laminating a striped colour filter with RGB (Red, Green, Blue) organisation on top of the image sensing area. The stripes are precisely aligned to the sensing elements, and the signal charged columns are multiplexed during the readout into three separate registers with three separate outputs corresponding to each individual colour.

One suitable type of CCD image sensor is Sony's ICX075AK ½ inch progressive scan image sensor. It has 823(H)x592(V) effective pixels (487216 pixels) and a dynamic range of 65 dB. The colour information is achieved through the use of a RGB primary colour filter, so that ¼ of all effective pixels is sensitive to blue light, ¼ is sensitive to red light and remaining ½ is sensitive to green light. Another suitable type of CCD image sensor is Sony's soon-to-be-released ICX205AK which has a resolution of 1434×1050 pixels, of which 1392×1040 are usable, and a dynamic range of 70 dB. This latter type of CCD has several discharge modes allowing both high and low resolution image output simultaneously. p The time for outputting all of the pixel signals is given as ⅕sec(40 msec). Therefore, the data rate for the ICX075AK can be calculated as:

data rate=no-of-pixels-per-frame/$t_{frame}$=487216pixels/ 0.40sec=12.2

Mpixels/sec
and pixel time is calculated as:
1/data rate=82.1 nsec.
(Note: the pixel time is actually less due to charge transfer times between lines and frames. With CXD2424 timing generator it is 68 nsec.)

In a preferred arrangement described in more detail in the afore-mentioned co-pending patent application entitle "Imaging Apparatus", the image sensing part of the apparatus comprises an array of multiple CCD sensors in order to obtain a high resolution. One preferred embodiment has a 2×2 array of CCDs, and another has a 5×5 array. In the latter case, 25 of the CCDs are placed in a 5×5 matrix; 5 sensors in each row and 5 sensors in each column. A 26th CCD sensor is employed to capture the whole image in low resolution.

Figure 11:
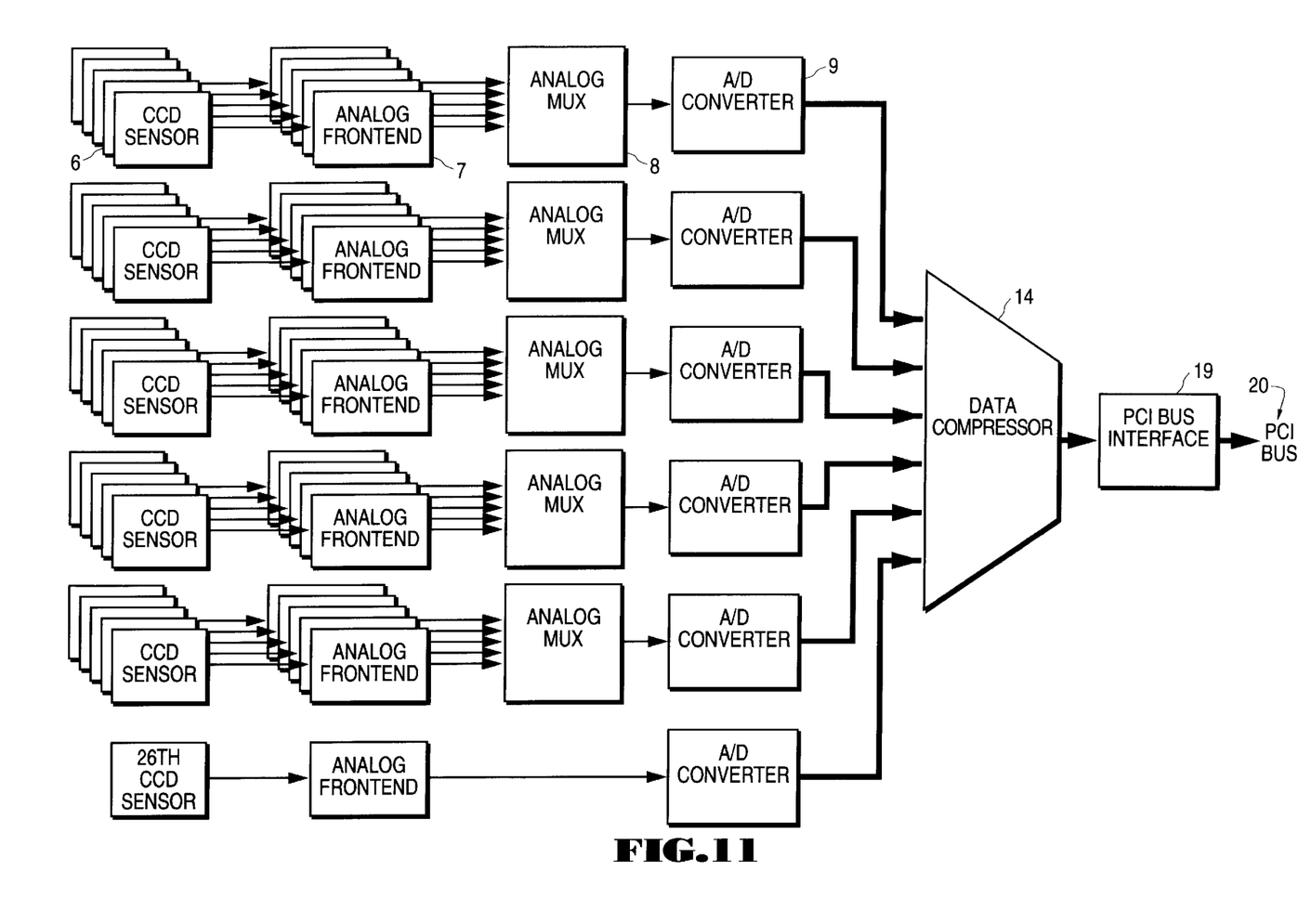
FIG. 11 is a schematic representation of a digital camera suitable for use in conjunction with the method of the present invention.

A more detailed diagram of that arrangement is shown in FIG. 11. Each CCD 6 captures a segment of the image and passes it to an associated "analog front-end" 7, which provides correlated double sampling, signal amplification, AGC, and sample-and-hold. The integrated circuit (IC) specified by Sony for the ICX075AK is CXA1690Q. However, other ICs such as Analog Device's AD9807 are also suitable.

The next component shown in FIG. 11 is the analog multiplexers 8, which reduce the number of analog-to-digital converters (A/D converters) 9 which are required. Each multiplexer 8 sequentially directs the analog signal from each sensor output to that row's A/D converter 9. There is one 5×1 multiplexer 8 for each row of the sensor array. The main criteria for the multiplexer is that its propagation delay should be low enough for 12.5 mhz (80 nsec) data rate.

The next component shown in both FIG. 1 and FIG. 11 is the A/D converters 2, 9, which convert the analog electrical signal into a digital signal. The resolution and dynamic range of the A/D converter stage—as well as speed—determine the required brightness resolution of the final digital image. The bit resolution required for >60000 levels is 16, but 16-bit converters are not presently commercially available. Possible sources for 10–20MSPS, 10–14bit A/D converters are:

Sony: 10 bit—specifies CXD2311AR (20MSPS) converter for ICX075AK

Analog Devices; 10 bit and 12 bit

Crystal: 10 bit and 12 bit

Brooktree: 8 bit only

Comlinear Corporation: 12 bit

DataI: 10 bit, 12 bit and 14 bit

Figure 12:
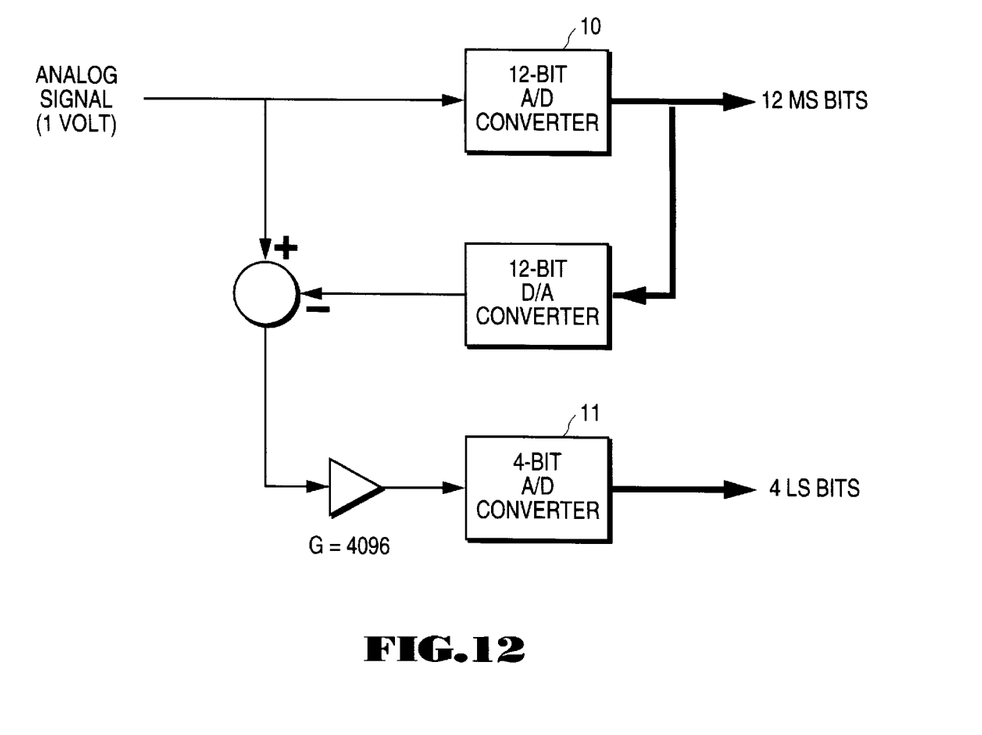
FIG. 12 shows a representation of a 16-bit analog to digital converter suitable for use in the camera of FIG. 11.

Bit resolution of the available converters introduces a potential problem in capturing the image with the brightness resolution required for processing of the final image to resolve "optical burn". Possible solutions for this problem include:

As shown in FIG. 12, a 16 bit converter can be made out of a 12 bit converter 10 and a 4 bit converter 11. The disadvantages of this method include the number of components required, requirement for trimming of D/A voltage, amplification of very low level (and high speed) signals, uncertainty about final performance and the development time.

Figure 13:
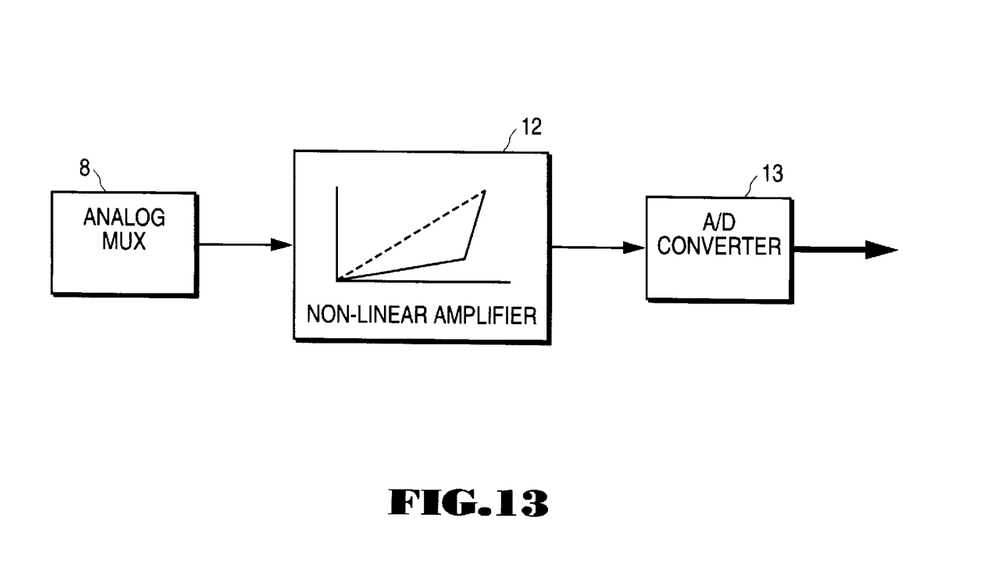
FIG. 13 is a representation of a non-linear amplifier suitable for eliminating "optical burn" in accordance with the invention.

As shown in FIG. 13, a non-linear amplifier 12 can be introduced preceding the A/D converter 13 such that the incremental voltage gain is kept at minimum at low brightness levels but increased to a higher value at high brightness levels. Although that brings a problem of gain-matching among all five row amplifiers, this problem can easily be tolerated because there will be considerable improvement in resolution.

After the A/D conversion stage, FIG. 1 shows some digital signal processors (DSPs) 3, 4, 5. These are primarily intended to provide data compression, and may be arranged in various different ways. As indicated above, in the arrangement of FIG. 1, the first DSP 3 filters out a user-selectable range of 8 data bits from a 16-bit signal.

The second DSP 4 of FIG. 1 converts the RGB signal produced by the CCD into a YUV signal. RGB signals are full-colour signals of the type typically used in computer displays, based on addition of red, green and blue signals. YUV signals are full colour signals in a different format, of a type used in PAL and SECAM formats (television formats used in Australia and Europe), with the three signal components representing intensity, chrominance and luminance. This conversion provides the first level of data compression. The technique relies on the fact that the human eye cannot differentiate colours as well as it does intensity. With the YUV format set to a ratio of 4:2:2, each 4 pixel group is represented by 4 intensity values, 2 blue and 2 red chrominance values which are averaged over the 4 pixel group; thus each 4 pixel group is represented by 8 values, whereas when represented by RGB each pixel in the four group would required separate red, green and blue values, requiring a total of 12 values for the same amount of data.

The third DSP 5 of FIG. 1 compresses the signal according to a compression algorithm such as Huffman encoding.

Different variants of Huffman coding exist, allowing different compression efficiencies. Although the actual compression ratio differs depending on the data being sampled by the coding technique, the advantage of using such techniques on images is that images generally contain large areas of consistency which considerably benefit the coding algorithms.

The data compressor stage 14 shown in FIG. 11 is required mainly to reduce the high data transfer rate to an acceptable level for a PC. This can be achieved by lossless image compression algorithms. Two of the possible algorithms are "Huffman coding" and "predictive coding". The input data for this stage is:

(5×3 654 120 bytes/frame)+730 824 bytes/frame=19 001 424 bytes/frame or 20 Mbytes/frame.

On the other hand, the data rate for a PC must be less than 40 Mbytes/sec (based on 100 nsec access time for DRAM and 32 bit data bus).

Therefore, it can be concluded that:

for 2 frames/sec camera speed, no compression is required;

for 3 frames/sec camera speed, 3×20/40=1.4, 1.5:1 compression is required;

for 4 frames/sec camera speed, 4×20/40=2.0, 2.0:1 compression is required;

for 5 frames/sec camera speed, 5×20/40=2.5, 2.5:1 compression is required.

(note: however, anything less than 5 frames/sec will require slower pixel clock or extra waiting states between scan lines.)

The options for the data compressor include:

One DSP for each A/D converter, e.g. Analog Devices' ADSP2181 or ADSP2171 or ADSP21csp01.

One (or more if required) 32bit fast DSP, e.g. TMS320C80 of Texas Instrument or SHARC or Analog Devices.

One (or more) Field Programmable Gate Array (FPGA).

The $1^{st}$ and $2^{nd}$ options are more suitable for Huffman coding. The $3^{rd}$ option is more suitable for predictive coding, especially for the simplest predictive coding algorithm, DPCM. (Another advantage of the $3^{rd}$ option is that it can incorporate PCI bus interface as well.)

Figure 15:
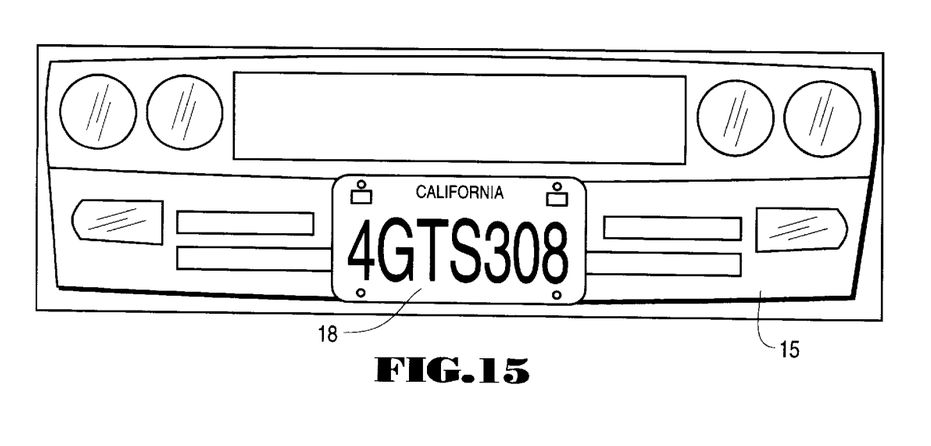
FIG. 15 shows a portion of the images of FIGS. 14a and 14b after processing according to the invention so that the licence plate has become legible.

During the data compression and digital signal processing stages, the intensity values of pixels in one or more regions of the image are adjusted to provide better visibility or clarity for the image in that region. In the examples illustrated in FIGS. 14 and 15, a region 15 (the front of a car) has been extracted from an image which shows a car 16 against a dark background scene 17. In the blown-up portion of FIG. 14, it is apparent that the licence plate 18 is not visible because of "plate burn". However, FIG. 15 shows the extracted region 15 after processing according to the present invention. The licence plate 18 has become visible.

The final stage shown in FIG. 11 is the PCI bus interface 19. The function of this stage is to form an interface stage between camera hardware and PC. It receives compressed data from the data compressor stage and arranges it for the 32 bit PCI bus 20. It receives PCI signals and prepares the necessary responses to send back. Depending upon the selected option for the data compressor, there will be different buffering and/or multiplexing between that stage and the PCI bus. An FPGA is suitable for this stage, due to its programming flexibility and speed. It may also function as an added compression stage (it may need an external fast SRAM for Huffman coding). Alternatively, a DMA (Direct Memory Access) port of a DSP can be used.

Turning now to the theory underlying the invention, the A/D conversion process is a sampling process, in which each sample is quantized. This quantization process converts the continuous-tone intensity, at the sample point, to a digital brightness value. The accuracy of the digital value is directly dependent upon how many bits are used in the quantizer. If 3 bits are used, the brightness can be converted to one of eight grey levels. In this case, grey level "0" represents black, grey level "7" represents white, and grey level "1" to "6" represent the ascending grey tones between black and white. The eight grey levels comprise what is called the grey scale, or in this case, the 3-bit grey scale.

Figure 2:
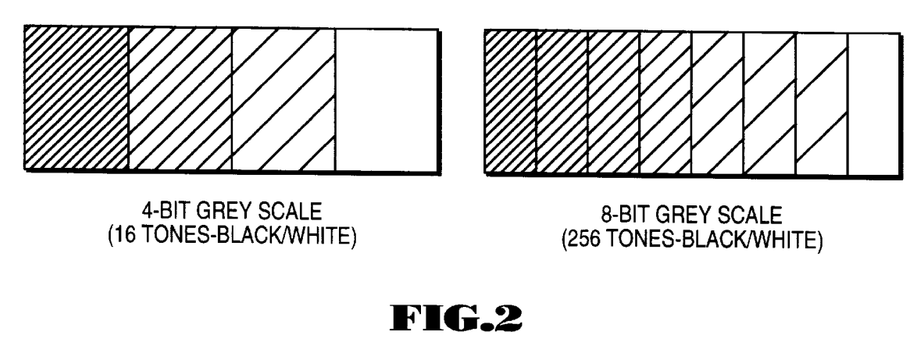
FIG. 2 shows a comparison between a 4-bit grey scale and an 8-bit grey scale.

With a 4-bit brightness value, every pixel's brightness is represented by one of 16 grey levels. A 5-bit brightness value yields a 32-level grey-scale range. An 8-bit brightness value yields a 256-level grey-scale range. Every additional bit used to represent the brightness doubles the range of the grey scale. The range of the grey scale is also referred to as dynamic range. An image with 8-bit brightness values is said to have an available dynamic range of 256 to 1. FIG. 2 shows two different grey scales. A four-bit grey scale 21 is represented on the left, and an 8-bit grey scale 22 is represented on the right. The transitions from black to white are more continuous in the 8-bit grey scale 22 than in the 4-bit grey scale 21. The smoothness of the grey scale improves as more bits are used to represent brightness.

Figure 3:
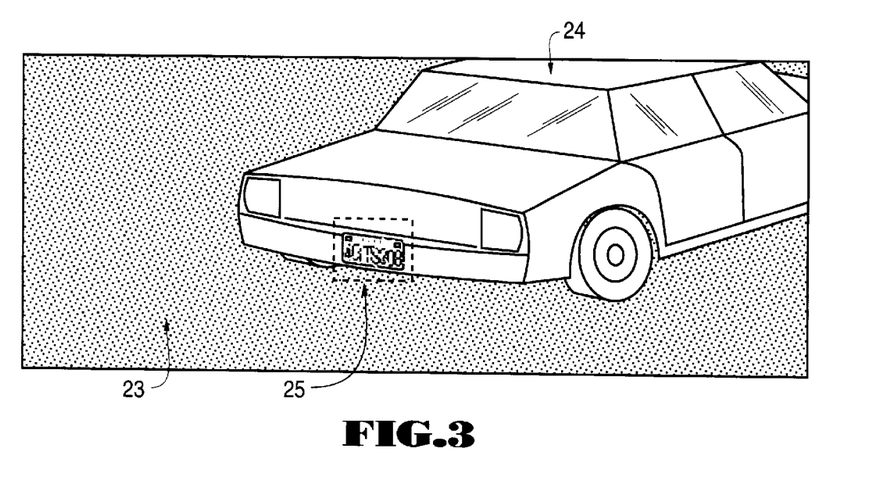
FIG. 3 shows an 8-bit image of a motor vehicle including a licence plate area.

For the purpose of illustrating the inventive method in use during a compression operation, the following examples relate to an 8-bit image (shown in FIG. 3) being dynamically sampled to a 4-bit image, and the resulting pictures are compared against the original 8-bit image. FIG. 3 shows an 8-bit image of a relatively dark background scene 23 with a vehicle 24 having a licence plate 25.

Three methods of dynamic extraction have been tested for this example.

EXAMPLE 1

10-levels and 6-levels representation

Figure 4:
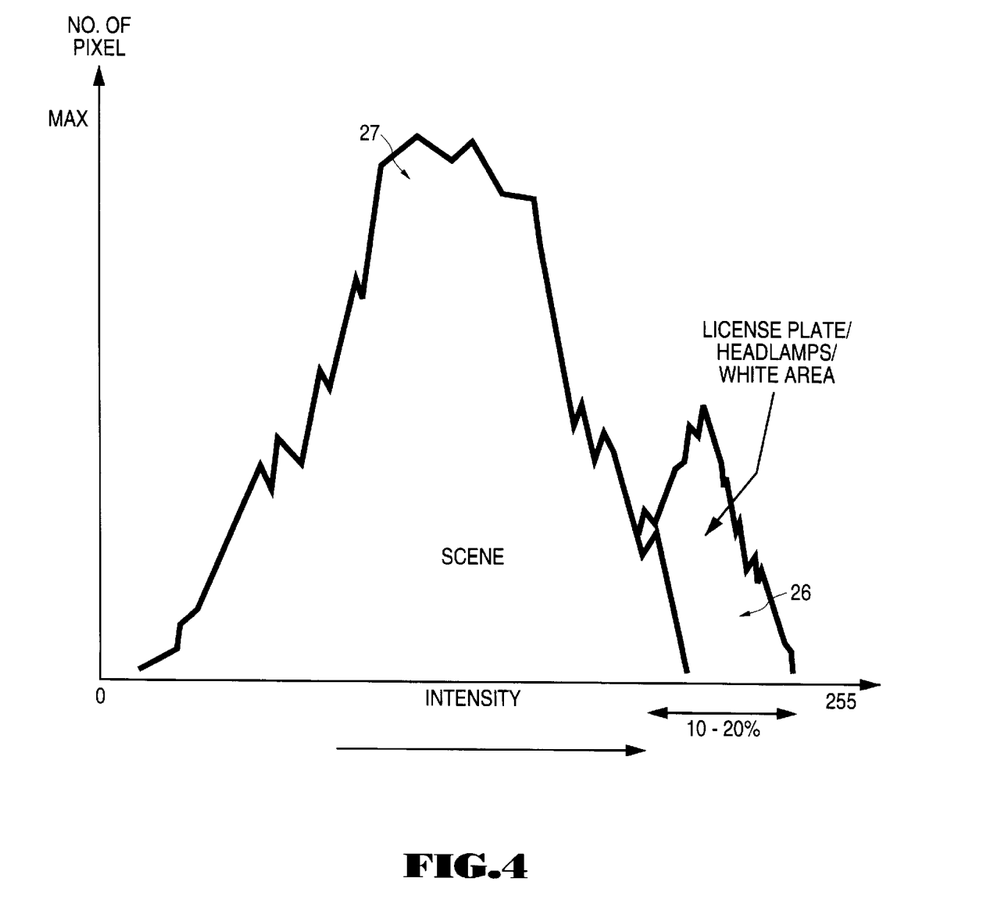
FIG. 4 is a graph of pixel intensity values for a typical speed violation image.

Typically, the brightest area of a speed and red-light violation image is in the licence plate area, the car head lamps or another white area. This means that these areas reflect most light energy, causing higher intensity light to enter the camera. FIG. 4 shows a typical histogram of the intensities of pixels in a speed violation image.

This method assumes that the Licence Plate is always located at the high 10–20% of the intensity graph 26. Pixel intensities for the remainder of the image 27 are centred around a lower value. Therefore, to convert the 8-bit image (255 levels of brightness) to a 4-bit (16 levels of brightness) image, 6 of the 16 levels in the final 4-bit image are assigned to the highest 10–20% intensities of the original 8-bit image (representing the Licence Plate) and the other 10 levels are assigned to the lowest 80–90% of intensities of the original image (representing the rest of the Scene). This method is described in the following pseudo code:

Compute the highest intensity (Ymax) of the image. The lowest intensity is assumed to be zero.

Calculate 10–20% high intensity range from the Ymax.

Compute the magnitude of each division for Scene image (10 levels)—Scene_Div and Licence Plate image (6 levels)—LP_Div.

Convert each pixel of the image to intensity Y.

For each pixel Y, if the intensity is in the "Scene" range, divide the intensity with the Scene_Div.

if the intensity is in the "Licence Plate" range, divide the intensity with the LP_Div.

For the purpose of displaying the 4-bit image with a graphics program, the resulting 4-bit image is converted back to an equivalent 8-bit image by multiplying each intensity value by the conversion factor (256/16).

For example: If Ymax=240.

20% intensity of the high end is 249*0.8=192

If a calculated Y intensity is 180 (in low intensity range), then the equivalent level is =180/Scene_Div If a calculated Y intensity is 230 (in high intensity range), then the equivalent level is =((240−230)/LP_Div)+10

Figure 5:
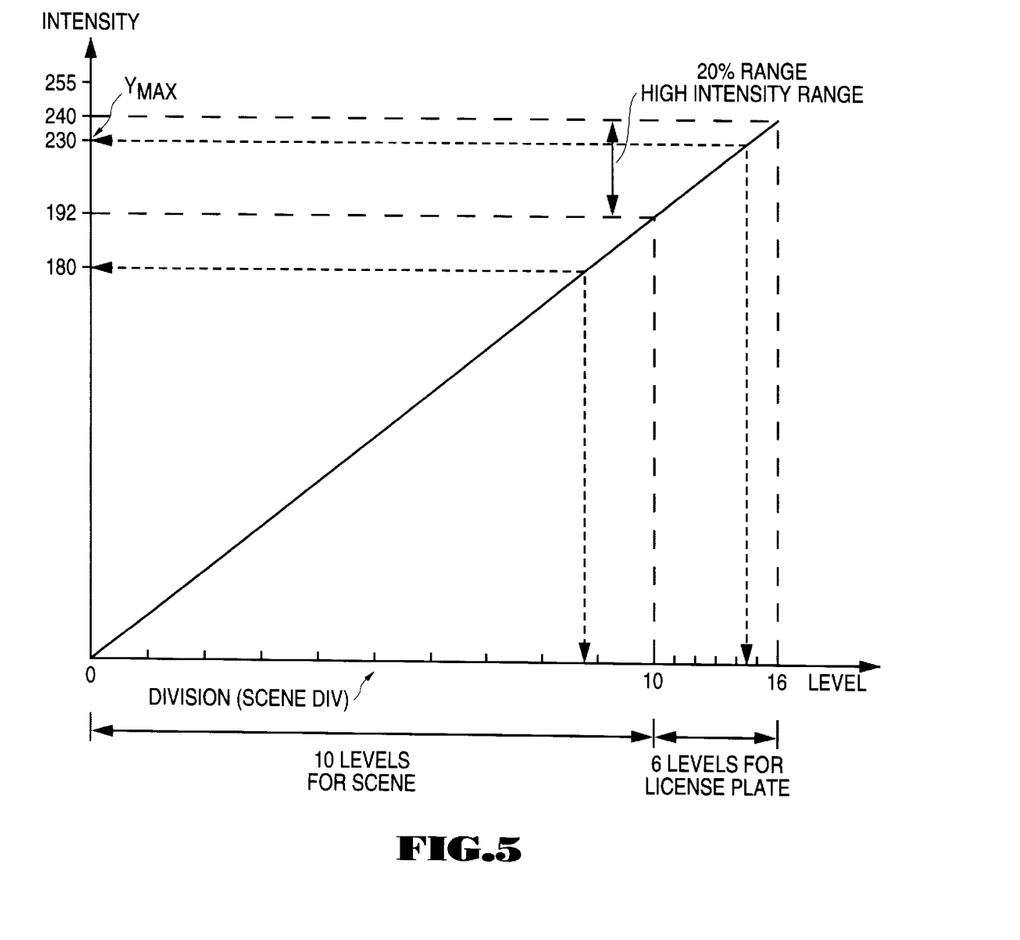
FIG. 5 is a diagram showing an algorithm for mapping 8-bit pixel intensity information to 4-bit information according to an embodiment of the invention.

FIG. 5 illustrates the mapping arrangement used by the above example.

Figure 6A:
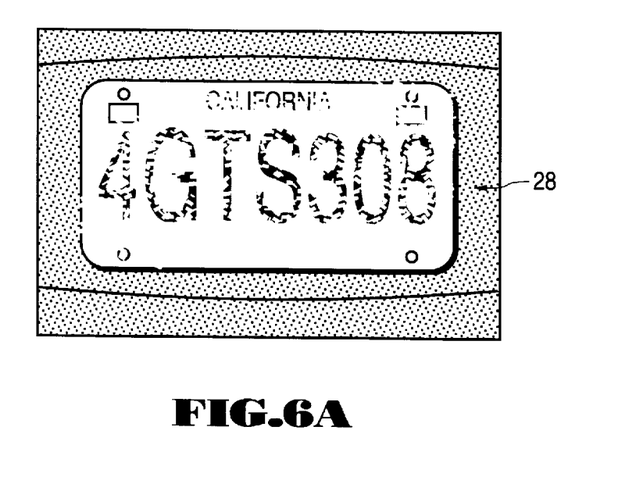
FIGS. 6a and 6b are 4-bit versions of the image of FIG. 3, with mapping done according to the algorithm of FIG. 5.
Figure 6B:
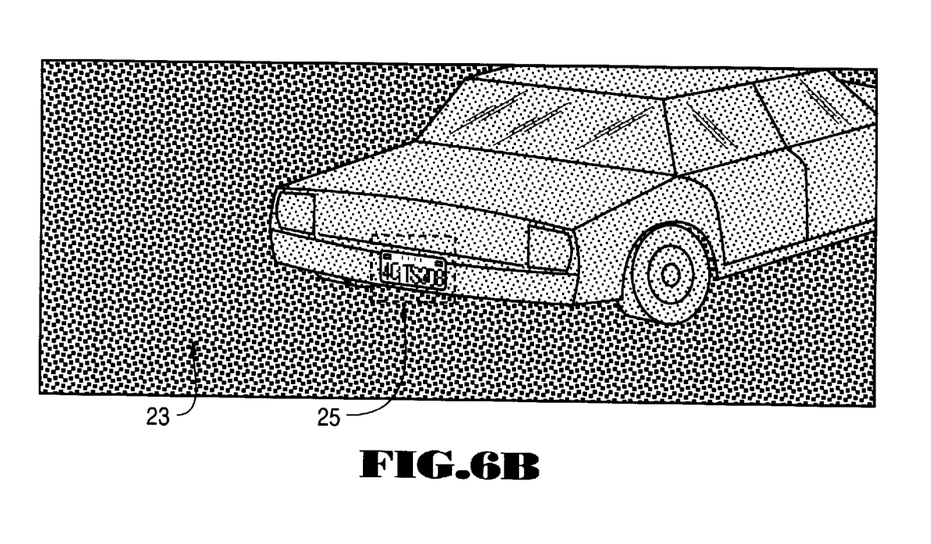

The resulting 4-bit image of the above described method is shown in FIG. 6, including a blown-up view 28 of the licence plate.

EXAMPLE 2

Bit wise representation

This option allows 4 individual bits of the 8-bit image to be selected to represent the 4-bit image. Since the High Order Bits (Most Significant Bit) contain the most information, 3 out of the 4 High Order Bits are normally selected to represent a 4-bit image. One bit is selected from the Low Order Bits to maintain the contrast of the Scene.

Figure 7:
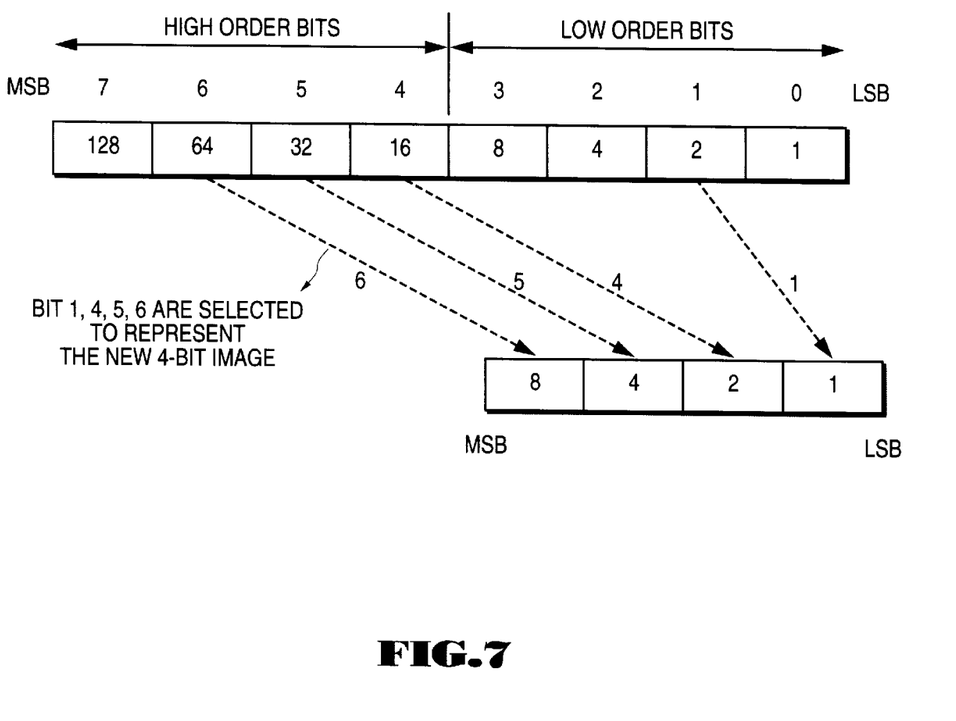
FIG. 7 is a schematic diagram illustrating another pixel intensity compression algorithm.
Figure 8:
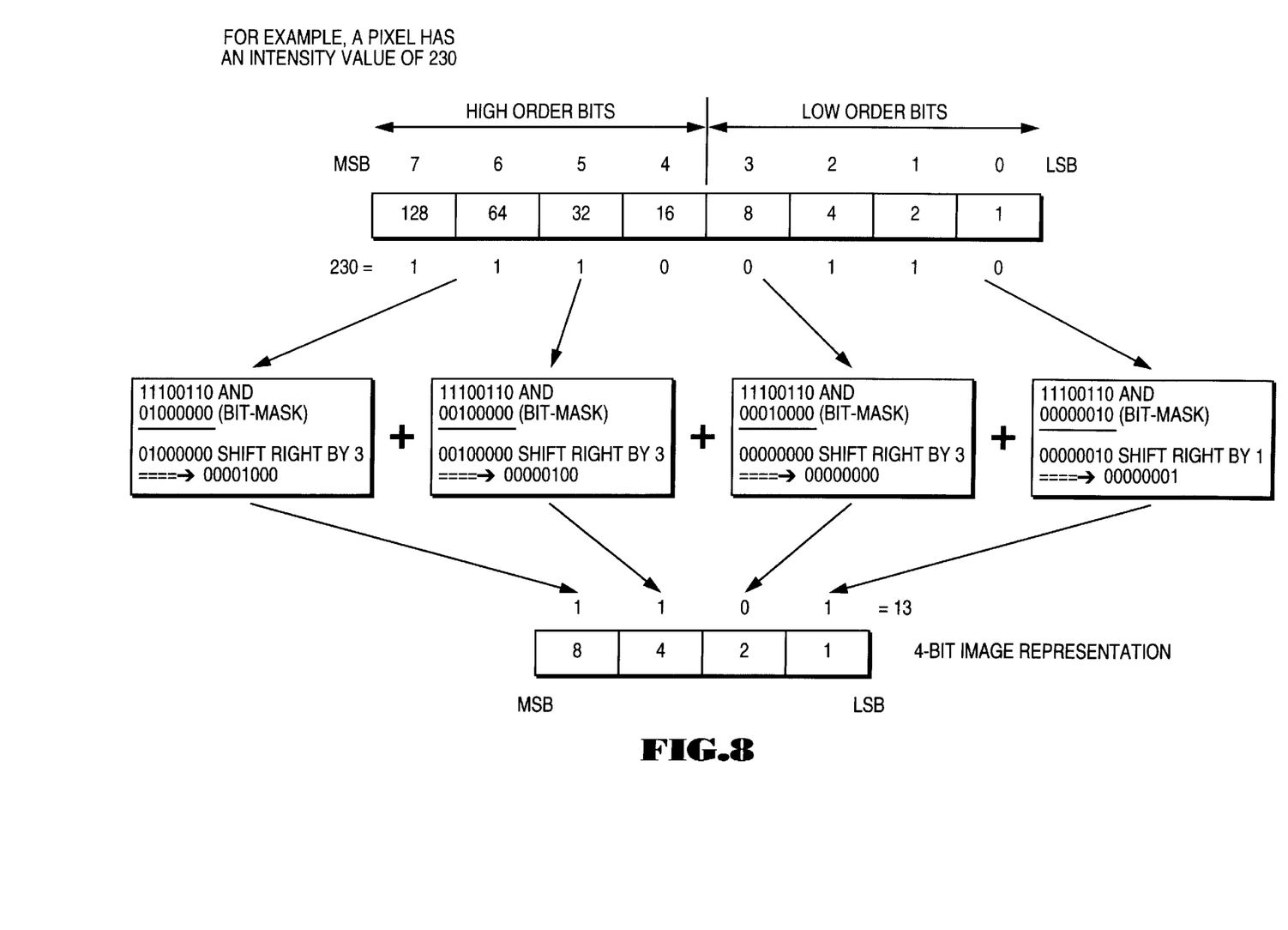
FIG. 8 is a further schematic diagram illustrating the compression algorithm.

This is illustrated in FIG. 7. Bits 1, 4, 5 and 6 are selected to represent the new 4-bit image. This could be accomplished by using a logical bit-mask AND method. The Bit-wise representation method is described in the following pseudo code:

Convert each pixel of the image to intensity Y;

For each intensity, perform a logical AND operation with the predetermined bit-mask and then perform the appropriate bit shifting operation. Eg. If bit 1, 4, 5 and 6 are to be selected to represent the 4-bit image, the bit-masks are 00000010, 00010000, 00100000 and 01000000. FIG. 8 illustrates the bit-mask logical AND and bit Shifting operations.

For the purpose of displaying this 4-bit image in a graphics program, each pixel is converted back to an equivalent 8-bit representation by multiplying its intensity value by a conversion factor (256/16).

Figure 9A:
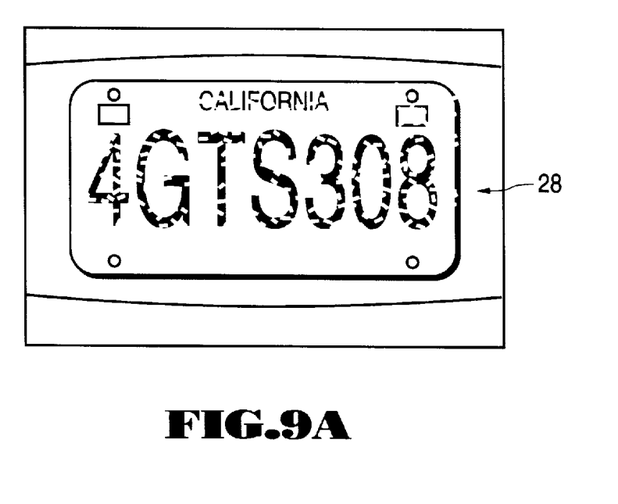
FIGS. 9a and 9b are 4-bit versions of the image of FIG. 3, with mapping done according to the algorithm of FIGS. 7 and 8.
Figure 9B:
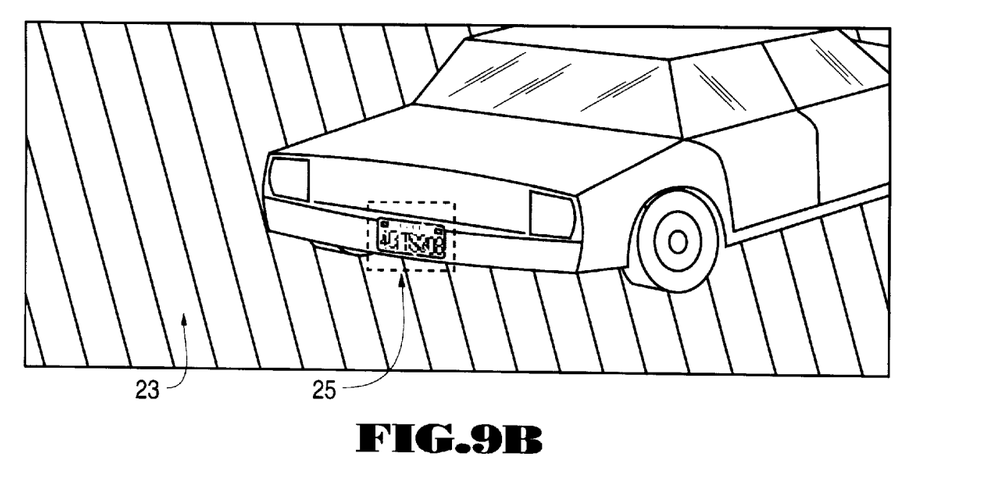

FIG. 9 is the result of the above described bit-wise representation. Bits 4, 5, 6, 7 are selected to represent the 4-bit image.

EXAMPLE 3

Direct division

This option is similar to the first option described above in which the Licence Plate and Scene are divided into two separate levels. The difference with this option is that each Licence Plate and Scene level is divided by 16. The following pseudo code describes this option:

Compute the highest intensity (Ymax) of the image. The lowest intensity is assumed to be zero.

Calculate 20% high intensity range from the Ymax. Calculate the value at 80%—Value_80.

Calculate the conversion factor for Licence Plate (Ymax/Ymax—Value_80) and Scene (Ymax/Value_80).

Convert each pixel of the image to intensity Y:

For each intensity, if the intensity is in the high intensity range (20% range), 1. Compute the magnitude of the intensity (intensity—Value_80).

2. Divide the magnitude by 16—((intensity—Value_80)/16).

3. Multiply the result with the conversion factor of the Licence Plate—result×(Ymax/Ymax−Value_80).

If the intensity is in the low intensity range,

1. Divide the intensity by 16—(intensity/16).

2. Multiply the result with the conversion factor of the Scene—result×(Ymax/Value_80).

For the purpose of displaying the 4-bit image with a graphics program, the resulting 4-bit image is converted back to an equivalent 8-bit image by multiplying each intensity value by the conversion factor (256/16).

Figure 10A:
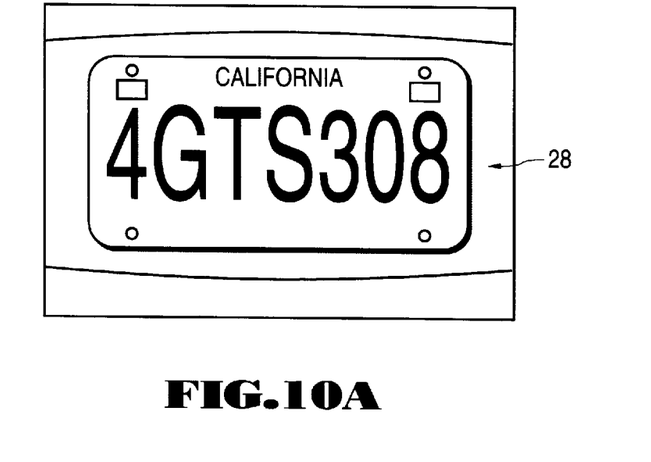
FIGS. 10a and 10b are 4-bit versions of the image of FIG. 3, with mapping done according to the direct division algorithm.
Figure 10B:
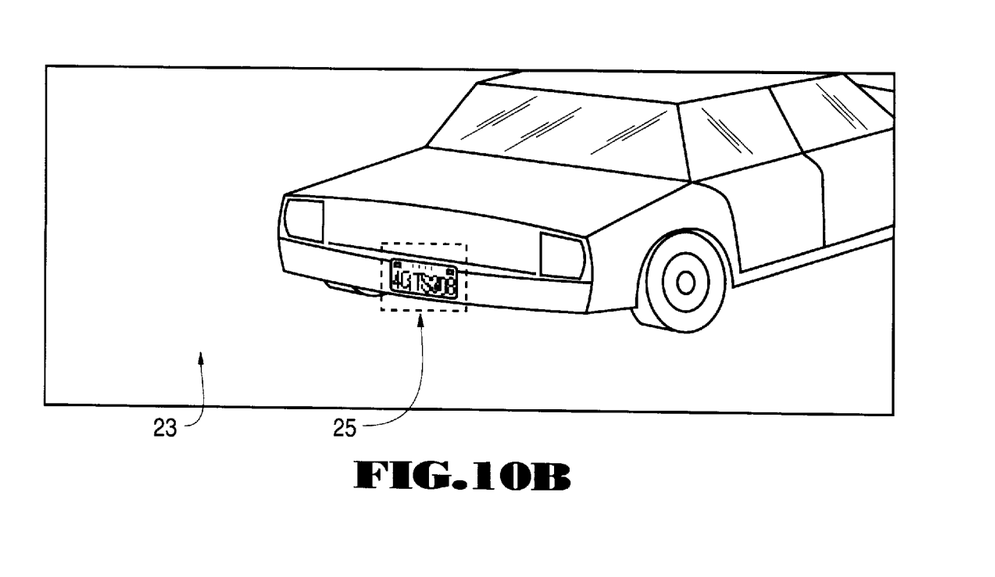

FIG. 10 shows the result of the Direct division method mentioned above.

The following observations may be made from the above experiments:

Experiment 1—10 levels and 6 levels representation:

Scene: Becomes darker but visible.

Licence Plate: More visible and readable than the original image.

Experiment 2—Bit-wise representation—bits 4, 5, 6, 7 (4 MSB):

Scene: Becomes brighter and similar to the original image.

Licence Plate: Brighter and very close to the original image.

Experiment 3—Direct Division:

Scene: Visible and similar to the original image.

Licence Plate: Poor—number is more difficult to read.

Conclusion: The method used in Experiment 1 is preferred above the others because the Licence Plate is more visible and more readable than the original image. The Scene is a somewhat darker, but that is not the critical part of the overall image.

It is to be understood that various alterations, modifications and additions may be made to the parts and methods described without departing from the ambit of the invention.

What is claimed is:

1. A method of processing digital image information which includes pixel intensity information, including the steps of:

identifying a region of the image in which pixel intensities are similar to each other, but the median pixel intensity differs significantly from the median pixel intensity of other parts of the image, wherein the pixel intensity corresponds to brightness of a pixel; and modifying pixel intensities in the identified region so that the median for the region is closer to the median for the other parts of the image.

2. A method according to claim 1 wherein the identified region is identified by locating computationally any pixels which have an intensity greater than a particular high value or less than a particular low value and which have more than a predetermined number of other pixels meeting the same criteria within a predetermined distance.

3. A method according to claim 2 further comprising the steps of:

reducing the pixel intensities of pixels which have intensity values higher than a predetermined threshold value; and increasing the pixel intensities of pixels which have intensity values lower than a predetermined threshold value.

4. A method according to claim 1 wherein a shape recognition algorithm is applied to the image to locate the region.

5. A method according to claim 1 further comprising the step of assigning pixel intensities within the region to values associated with a grey scale range.

6. A method according to claim 5 wherein the digital image is comprised of a first number of bits, and further comprising the steps of:

converting the digital image from the first number of bits to a second number of bits, the second number of bits being lower than the first number of bits;

mapping a portion of the image comprising the converted digital image from pixels of the digital image that are above a predetermined intensity value; and multiplying the intensity value of each pixel of the converted digital image by a conversion factor for display of the converted digital image.

7. A method of processing digital image information by modifying pixel intensities according to a non-linear algorithm, with the result that one or more regions of the image have their median pixel intensities adjusted to a level which is closer to the median pixel intensity for other parts of the image, wherein the pixel intensities correspond to brightnesses of the pixels.

8. A method according to claim 7 wherein the non-linear algorithm involves reduction of pixel intensities which have intensity values higher than a predetermined threshold value and/or intensification of pixel intensities which have intensity values lower than a predetermined threshold value.

* * * * *